(No Model.)
G. F. DAY & E. H. COLE.
WAVE FORCE PUMP.
No. 429,231. Patented June 3, 1890.
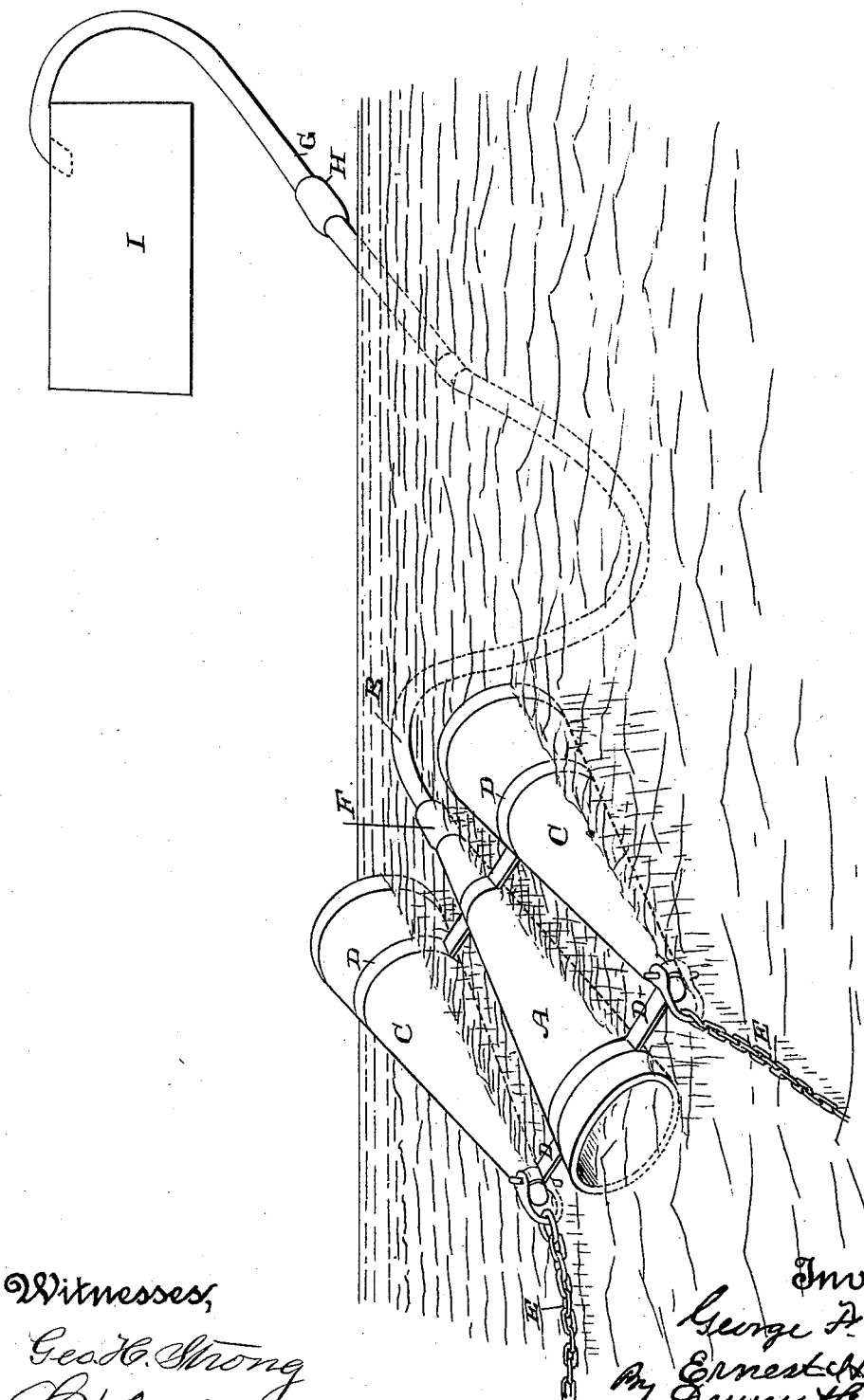
Witnesses,
Geo. H. Strong
J. H. Nourse
Inventors,
George F. Day
Ernest H. Cole
By Dewey & Co.
Attys

UNITED STATES PATENT OFFICE.

GEORGE F. DAY AND ERNEST H. COLE, OF SAN FRANCISCO, CALIFORNIA.

WAVE-FORCE PUMP.

SPECIFICATION forming part of Letters Patent No. 429,231, dated June 3, 1890.

Application filed October 2, 1889. Serial No. 325,771. (No model.)

*To all whom it may concern:*

Be it known that we, GEORGE F. DAY and ERNEST H. COLE, citizens of the United States, residing in the city and county of San Francisco, State of California, have invented an Improvement in Wave-Force Pumps; and we hereby declare the following to be a full, clear, and exact description of the same.

Our invention relates to a device which we call a "wave-force pump;" and it consists of an open-mouthed cone or chamber decreasing in area from the mouth toward the rear end, and having its mouth presented to receive the waves, and in connection therewith of a conducting-pipe with check-valves, all of which will be more fully explained by reference to the accompanying drawing, in which the figure represents the arrangement of our apparatus.

A is a large conically-shaped chamber, of any suitable form, the mouth of which is preferably made of large diameter, and the chamber tapers back to a size small enough to have the flexible conducting-pipe B attached to it. The chamber A may be supported upon floats C, to which it is united by suitable straps or connections D. These floats are anchored by chains E, so that they will not be swept away by the force of the waves. We have shown these floats preferably having the smallest and pointed ends opposite the large open mouth of the cone A, so that this end of the floats will not be so readily raised by the action of the waves. The result will be that when the waves strike the mouth of the cone A the latter will be entirely submerged and the water will rush backward within the cone, being compressed and increasing its velocity, so that when it reaches the rear end of the cone it will rush through the check-valve F into the flexible pipe B, which communicates with the rigid pipe G, having a second check-valve H in it. The water is conveyed through these pipes, the successive impulses within the cone forcing the water along the pipe until it is discharged into a tank at I, and as the force of the water compressed within the cone A is very great it will open the check-valves and be forced along the conveying-pipes, so as to raise the water to a considerable elevation.

It will be manifest that we may employ a permanent pier having one or a series of funnel-shaped chambers so placed that the force of the waves rushing into the diminishing chambers will produce such an acceleration of speed and momentum that it will force a body of water through pipes to a considerable height.

Having thus described our invention, what we claim as new, and desire to secure by Letters Patent, is—

1. The open-mouth funnel-shaped chamber, the floats or supports to which it is attached, and anchors by which these floats are held so as to present the mouth of the funnel toward the approaching waves of the sea, in combination with the conveying-pipe connected with the rear or smaller end of the funnel, and check-valves in said pipe to prevent the return of the water, substantially as herein described.

2. The funnel-shaped chamber A and the conical float C with the uniting bands or connections, whereby the funnel-shaped chamber is suspended between the floats, with the larger end opposite the smaller end of the floats, anchors and chains whereby said floats are fixed so as to hold the mouth of the funnel toward the approaching waves of the sea, a conveying-pipe connected with the smaller end of the funnel, and check-valves fixed in said pipe to prevent the return of the water into the funnels, substantially as herein described.

In witness whereof we have hereunto set our hands.

GEORGE F. DAY.
ERNEST H. COLE.

Witnesses:
S. H. NOURSE,
H. C. LEE.